(12) United States Patent
Hirman et al.

(10) Patent No.: US 11,370,617 B2
(45) Date of Patent: Jun. 28, 2022

(54) FLEXIBLE HOPPER FOR A CONVEYOR SYSTEM

(71) Applicant: Caterpillar Paving Products Inc., Brooklyn Park, MN (US)

(72) Inventors: Colton Hirman, Maple Grove, MN (US); Nathan Mashek, St. Michael, MN (US); Nick Johnson, Dayton, MN (US); Ryan Hutar, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 121 days.

(21) Appl. No.: 16/751,279

(22) Filed: Jan. 24, 2020

(65) Prior Publication Data

US 2020/0156872 A1 May 21, 2020

Related U.S. Application Data

(62) Division of application No. 16/018,634, filed on Jun. 26, 2018, now Pat. No. 10,589,933.

(51) Int. Cl.
*B65G 67/12* (2006.01)
*B65G 11/10* (2006.01)
*E01C 23/06* (2006.01)
*B65G 11/20* (2006.01)

(52) U.S. Cl.
CPC .......... *B65G 11/106* (2013.01); *B65G 11/206* (2013.01); *E01C 23/06* (2013.01); *B65G 2201/04* (2013.01)

(58) Field of Classification Search
CPC ....... B65G 67/08; B65G 67/22; E01C 23/122; E01C 23/124; E01C 23/125; E01C 23/127
USPC ..................... 198/314; 404/90, 91
See application file for complete search history.

(56) References Cited

U.S. PATENT DOCUMENTS

| | | | | |
|---|---|---|---|---|
| 3,035,682 | A | * 5/1962 | Ferch | B65G 11/106 198/550.1 |
| 3,061,282 | A | * 10/1962 | Hilkemeier | B28C 5/4237 366/44 |
| 3,163,280 | A | * 12/1964 | Haugland | B65G 67/24 193/25 R |
| 3,168,946 | A | 2/1965 | Gay | |
| 3,590,983 | A | * 7/1971 | Oury | E04G 21/04 198/530 |
| 3,738,464 | A | 6/1973 | Ortlip et al. | |
| 4,139,318 | A | * 2/1979 | Jakob | E01C 23/088 37/219 |

(Continued)

FOREIGN PATENT DOCUMENTS

CA 2768953 A1 8/2013
CN 107107806 B 5/2020

(Continued)

*Primary Examiner* — Joseph A Dillon, Jr.
(74) *Attorney, Agent, or Firm* — Harrity & Harrity LLP

(57) ABSTRACT

Some examples described herein include a flexible hopper for a conveyor system. The flexible hopper may include a hopper weldment attached to a frame of the conveyor, wherein the hopper weldment surrounds a charge end of the conveyor, a flexible frame configured to enable an opening of the flexible hopper to expand or contract, and/or a skirt attached to the flexible frame and configured to form an enclosure between the flexible frame and the hopper weldment.

14 Claims, 5 Drawing Sheets

(56) References Cited

U.S. PATENT DOCUMENTS

| | | | |
|---|---|---|---|
| 4,361,079 A | 11/1982 | Christensen et al. | |
| 4,478,548 A * | 10/1984 | Heimes | A01D 90/105 |
| | | | 414/502 |
| 4,610,344 A | 9/1986 | Eastman | |
| 4,741,687 A | 5/1988 | Eltvedt | |
| 4,778,031 A | 10/1988 | Curiel | |
| 5,277,538 A | 1/1994 | Theurer et al. | |
| 5,722,790 A | 3/1998 | Spray | |
| 5,740,903 A * | 4/1998 | Epp | B65G 33/24 |
| | | | 198/588 |
| 5,788,055 A * | 8/1998 | Stewart | B65G 33/32 |
| | | | 414/505 |
| 5,820,773 A | 10/1998 | Hintzman et al. | |
| 6,845,859 B2 * | 1/2005 | Grundl | E01C 19/48 |
| | | | 198/588 |
| 7,237,753 B2 | 7/2007 | Metcalfe | |
| 7,540,687 B2 | 6/2009 | Neumann | |
| 8,485,336 B2 | 7/2013 | Tenold et al. | |
| 8,752,694 B2 | 6/2014 | Putman | |
| 9,708,779 B2 | 7/2017 | Brown | |
| 9,957,108 B2 | 5/2018 | Ho et al. | |
| 10,005,622 B1 | 6/2018 | Narsingh | |
| 10,106,333 B2 * | 10/2018 | Beaujot | B65G 65/34 |
| 10,227,740 B2 * | 3/2019 | Verhaelen | E01C 23/088 |
| 2004/0143928 A1 * | 7/2004 | Engel | E01H 1/042 |
| | | | 15/340.1 |
| 2004/0221562 A1 * | 11/2004 | Snider | A01D 57/26 |
| | | | 56/16.4 R |
| 2005/0217976 A1 | 10/2005 | Hall | |
| 2008/0014032 A1 | 1/2008 | Rillmann | |
| 2009/0139828 A1 | 6/2009 | Burstrom et al. | |
| 2009/0152073 A1 | 6/2009 | Fischer et al. | |
| 2011/0272510 A1 * | 11/2011 | Ragnarsson | B02C 21/026 |
| | | | 241/101.2 |
| 2012/0145608 A1 * | 6/2012 | Garland | B07B 11/06 |
| | | | 209/245 |
| 2014/0183003 A1 | 7/2014 | Jorgensen et al. | |
| 2016/0167819 A1 * | 6/2016 | Nakai | B02C 1/00 |
| | | | 241/266 |
| 2016/0236231 A1 | 8/2016 | Chastine et al. | |
| 2016/0264366 A1 | 9/2016 | Heitplatz | |
| 2017/0009409 A1 | 1/2017 | Verhaelen et al. | |
| 2019/0003133 A1 | 1/2019 | Tkachenko et al. | |
| 2019/0086026 A1 * | 3/2019 | Hirman | E01C 23/127 |
| 2019/0135553 A1 | 5/2019 | Hirman | |
| 2019/0299242 A1 * | 10/2019 | Chastine | F27D 27/005 |
| 2021/0131047 A1 * | 5/2021 | Hirman | E01C 23/127 |
| 2021/0198853 A1 * | 7/2021 | Winkels | E01C 23/088 |
| 2021/0339962 A1 * | 11/2021 | Weiler | B65G 67/24 |
| 2022/0042257 A1 * | 2/2022 | Schaaf | B65G 11/146 |

FOREIGN PATENT DOCUMENTS

| | | |
|---|---|---|
| DE | 102015212902 A1 | 1/2017 |
| EP | 0336815 A1 | 10/1989 |
| WO | 2010045952 A1 | 4/2010 |

* cited by examiner

FLEXIBLE HOPPER FOR A CONVEYOR SYSTEM

RELATED APPLICATION

This application is a divisional of U.S. patent application Ser. No. 16/018,634, filed Jun. 26, 2018, which is incorporated herein by reference.

TECHNICAL FIELD

The present disclosure relates generally to transfer of material using conveyors and, more particularly, to a flexible hopper for a conveyor system.

BACKGROUND

Asphalt-surfaced roadways are built to facilitate vehicular travel. Depending upon usage density, base conditions, temperature variation, moisture levels, and/or physical age, the surfaces of the roadways eventually become misshapen and unable to support wheel loads. In order to rehabilitate the roadways for continued vehicular use, spent asphalt is removed in preparation for resurfacing.

Cold planers, sometimes also called road mills or scarifiers, are used to break up and remove layers of an asphalt roadway. A cold planer typically includes a frame propelled by tracked or wheeled drive units. The frame supports an engine, an operator station, a milling drum, and conveyors. The milling drum, fitted with cutting tools, is rotated through a suitable interface with the engine to break up the surface of the roadway. The broken-up roadway material is deposited by the milling drum onto a first conveyor that transfers the broken-up roadway material from a discharge end of the first conveyor to a charge end of a second conveyor. The second conveyor may deposit the broken-up roadway material the from a discharge end of the second conveyor toward a direction of travel (e.g., that is parallel to the first conveyor and/or second conveyor) of the cold planer. The second conveyor may be configured to pivot about the charge end of the second conveyor to enable the second conveyor to deposit the broken-up roadway material from the cold planer at an angle that is not parallel to the first conveyor. During operation, however, when the broken-up roadway material is transferred from the first conveyor to the second conveyor, some of the broken-up roadway material may not reach the second conveyor due to mis-alignment of the charge end of the second conveyor and the discharge end of the first conveyor and/or due to the amount of material that is grouped together and/or transferred at one moment. As such, broken-up roadway material that does not reach the second conveyor may be deposited within the cold planer, on the remaining roadway, or the like.

One attempt to transfer milled material is described in U.S. Patent Application Publication No. 2017/0009409 to Verhaelen et al. and was published on Jan. 12, 2017 ("the Verhaelen reference"). In particular, the Verhaelen reference describes a transfer housing arranged to receive milled-off material from a first conveyor that includes a first transfer opening essentially coaxial to a vertical pivoting axis and open downwardly. The Verhaelen reference further describes a reception housing arranged at a second conveyor and includes an upwardly open reception opening and a lid covering at least a major part of the reception opening. In the Verhaelen reference, the lid includes a passage opening configured to allow communication of the transfer opening with the reception opening.

While the transfer element of the Verhaelen reference may enable transfer material to be deposited from the second conveying device that is transverse to the direction of travel of the milling machine and/or the first conveying device, the transfer element may not resolve issues with range of movement of the second conveying device relative to the first conveying device and/or varying amounts of material being transferred from the first conveying device to the second conveying device.

The flexible hopper of the present disclosure solves one or more of the problems set forth above and/or other problems in the art.

SUMMARY

According to some implementations, a cold planer may include a frame; at least one traction device configured to support the frame; an engine supported by the frame and configured to drive the at least one traction device to propel the cold planer; a milling drum; a first conveyor comprising a first charge end, configured to receive material removed by the milling drum, and a first discharge end; a second conveyor comprising a second charge end and a second discharge end; and a flexible hopper fixed to the second charge end of the second conveyor and configured to receive material from the first discharge end of the first conveyor. The flexible hopper may include a flexible frame and/or a flexible skirt attached to the frame and configured to form an enclosure between the first discharge end and the second charge end.

According to some implementations, a conveyor system may include a first conveyor to convey material from a first charge end to a first discharge end; a second conveyor to convey material from a second charge end to a second discharge end; and a flexible hopper configured to receive material from the first discharge end. The flexible hopper may be attached to the second charge end of the second conveyor and include a hopper weldment that surrounds the second charge end, a flexible frame attached to the hopper weldment, and/or a flexible skirt attached to the flexible frame and configured to form an enclosure between the first discharge end and the second charge end.

According to some implementations, a flexible hopper may be configured to receive material that is to be conveyed on a conveyor. The flexible hopper may include a hopper weldment attached to a frame of the conveyor, wherein the hopper weldment surrounds a charge end of the conveyor; a flexible frame configured to enable an opening of the flexible hopper to expand or contract; and/or a skirt attached to the flexible frame and configured to form an enclosure between the flexible frame and the hopper weldment.

DETAILED DESCRIPTION

This disclosure relates to a flexible hopper for a conveyor system. The flexible hopper has universal applicability to any machine utilizing such a conveyor system. The term "machine" may refer to any machine that performs an operation associated with an industry such as, for example, mining, construction, farming, transportation, or any other industry. As some examples, the machine may be a cold planer, a compactor, a feller buncher, a forest machine, a forwarder, a harvester, an excavator, an industrial loader, a knuckleboom loader, a material handler, a motor grader, a road reclaimer, a tractor scraper, or other paving or underground mining equipment.

A cold planer may refer to a machine used to remove material, such as hardened asphalt, from a ground surface, such as a roadway. A conveyor system may transfer the material from the ground surface to a haul vehicle (e.g., a wagon or tractor trailer). The conveyor system may include multiple conveyors that transfer material to one another. The conveyors may be aligned with one another to enable the material to be deposited in a direction of travel of the cold planer and/or transverse to one another to enable the material to be deposited transverse to a direction of travel of the cold planer. During operation of the cold planer, a first conveyor and a second conveyor of the conveyor system of the cold planer may move independently from one another. For example, a position of the first conveyor can change relative to a position of the second conveyor (and vice versa) (e.g., based on pivoting one or both of the conveyors, rotating one or both of the conveyors, lifting one or both of the conveyors, lowering one or both of the conveyors, and/or the like). Some implementations described herein assist with ensuring varying amounts of the material, when transferred from the first conveyor to the second conveyor, are captured and transferred to the second conveyor to enable the second conveyor to remove the material from the cold planer. Furthermore, some implementations described herein may be applied to any conveyor system that receives any type of material at a first location and conveys that material to a second location.

Figure 1:
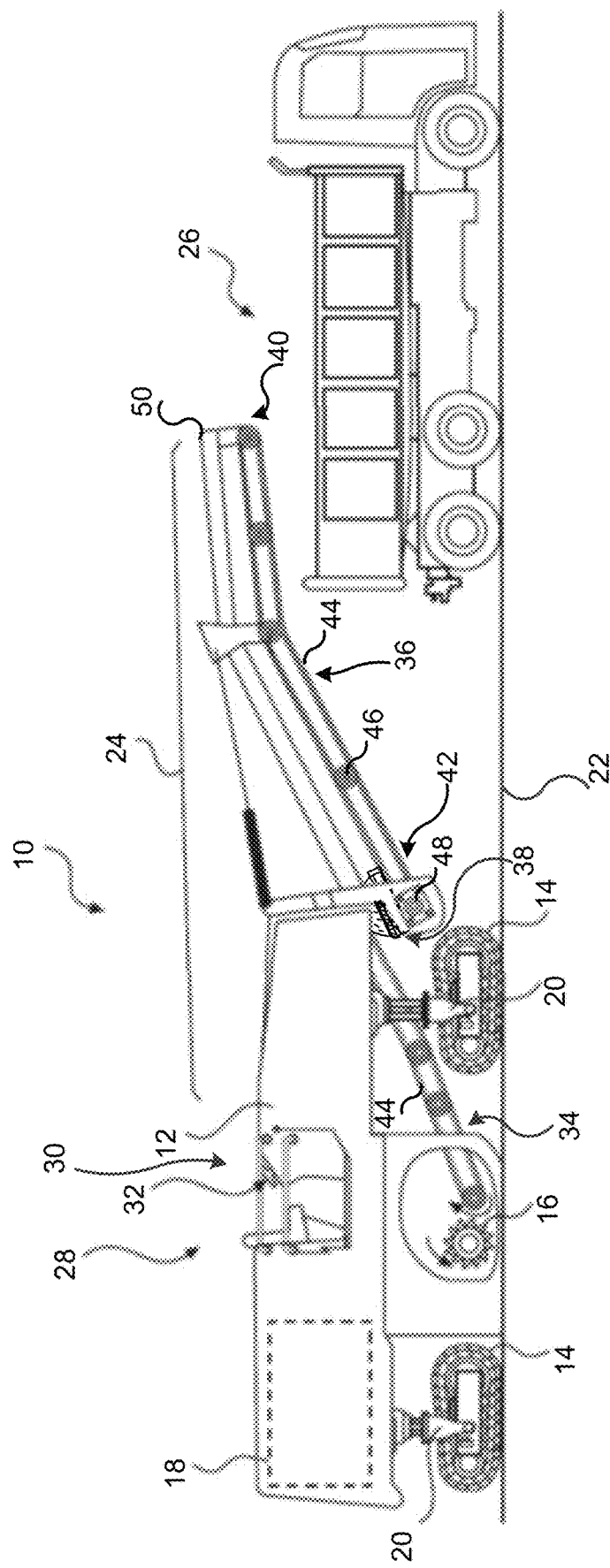
FIG. 1 is a diagram of an example cold planer.

FIG. 1 is a diagram of an example cold planer 10 having a frame 12 supported by one or more traction devices 14, a milling drum 16 rotationally supported under a belly of frame 12, and an engine 18 mounted to frame 12 and configured to drive traction devices 14 and milling drum 16. Traction devices 14 may include either wheels or tracks connected to actuators 20 that are adapted to controllably raise and lower frame 12 relative to a ground surface. Raising and lowering of frame 12 may function to vary a milling depth of milling drum 16 into a work surface 22. In some implementations, the same or different actuators 20 may be used to steer cold planer 10 and/or to adjust a travel speed of traction devices 14 (e.g., to speed up or brake traction devices 14). A conveyor system 24 may be connected at a leading end to frame 12 and configured to transport material away from milling drum 16 and into a receptacle, such as a waiting haul vehicle 26.

Frame 12 may support an operator station 28. In some implementations, operator station 28 may be located at a side of cold planer 10 opposite milling drum 16. In some implementations, operator station 28 may be located off-board cold planer 10. For example, operator station 28 may include a remote control, such as a handheld controller, that an operator may use to control cold planer 10 from anywhere on a worksite. Additionally, or alternatively, operator station 28 may include a combination of hardware and software, such as a software program executing on a computer or a processor. In some implementations, cold planer 10 may be an autonomous vehicle and may not include operator station 28. Operator station 28 may house a control console 30 with any number of interface devices 32 used to control cold planer 10.

Conveyor system 24 may include a first conveyor 34 adjacent milling drum 16. First conveyor 34 is configured to receive milled material from milling drum 16 at a charge end of first conveyor 34, and to provide, at a discharge end of first conveyor 34, the milled material to a second conveyor 36. Second conveyor 36 may receive the milled material via a flexible hopper 38 of second conveyor 36, positioned below first conveyor 34, and may dispense the milled material into haul vehicle 26 at an elevated discharge end 40 of second conveyor 36. Flexible hopper 38 may be connected to (e.g., fixed to, attached to, fastened to, formed as a part of, adhered to, or the like) second conveyor 36 at a charge end 42 of second conveyor 36. Flexible hopper 38 may include one or more flexible supports, a skirt, a hopper weldment, or the like to receive the milled material and may be able to expand or contract as necessary for the amount of material being transferred and/or expand or contract as necessary according to the configuration of first conveyor 34 relative to second conveyor 36. In some implementations, charge end 42 may be configured in a position below a discharge end of first conveyor 34, such that material transferred from the discharge end of first conveyor 34 falls into flexible hopper 38 and charge end 42 of second conveyer 36.

Second conveyor 36 may be rotatably attached to frame 12 at charge end 42 so that second conveyor 36 can vertically rotate and a height at which milled material leaves second conveyor 36 at discharge end 40 may be adjusted. Additionally, or alternatively, second conveyor 36 may be rotatably attached to frame 12 at charge end 42 so that second conveyor 36 can horizontally rotate so that a direction at which milled material leaves second conveyor 36 may be adjusted relative to a direction of travel of cold planer 10 or first conveyor 34.

As shown in FIG. 1, first conveyor 34 and second conveyor 36 may each include a belt 44 that is supported by one or more roller assemblies 46 and driven by a motor 48 (only one motor 48 is shown in FIG. 1). Motor 48 may include, for example, a hydraulic motor, an electric motor, or the like. Second conveyor 36 may include a cover 50 to prevent debris from falling and/or accumulating on belt 44 or other components of second conveyor 36.

As indicated above, FIG. 1 is provided as an example. Other examples are possible and may differ from what was described in connection with FIG. 1. For example, while conveyor system 24 is described herein as working with cold planer 10, in some implementations, conveyor system 24 may work with another type of machine and/or may work separately from a machine.

Figure 2:
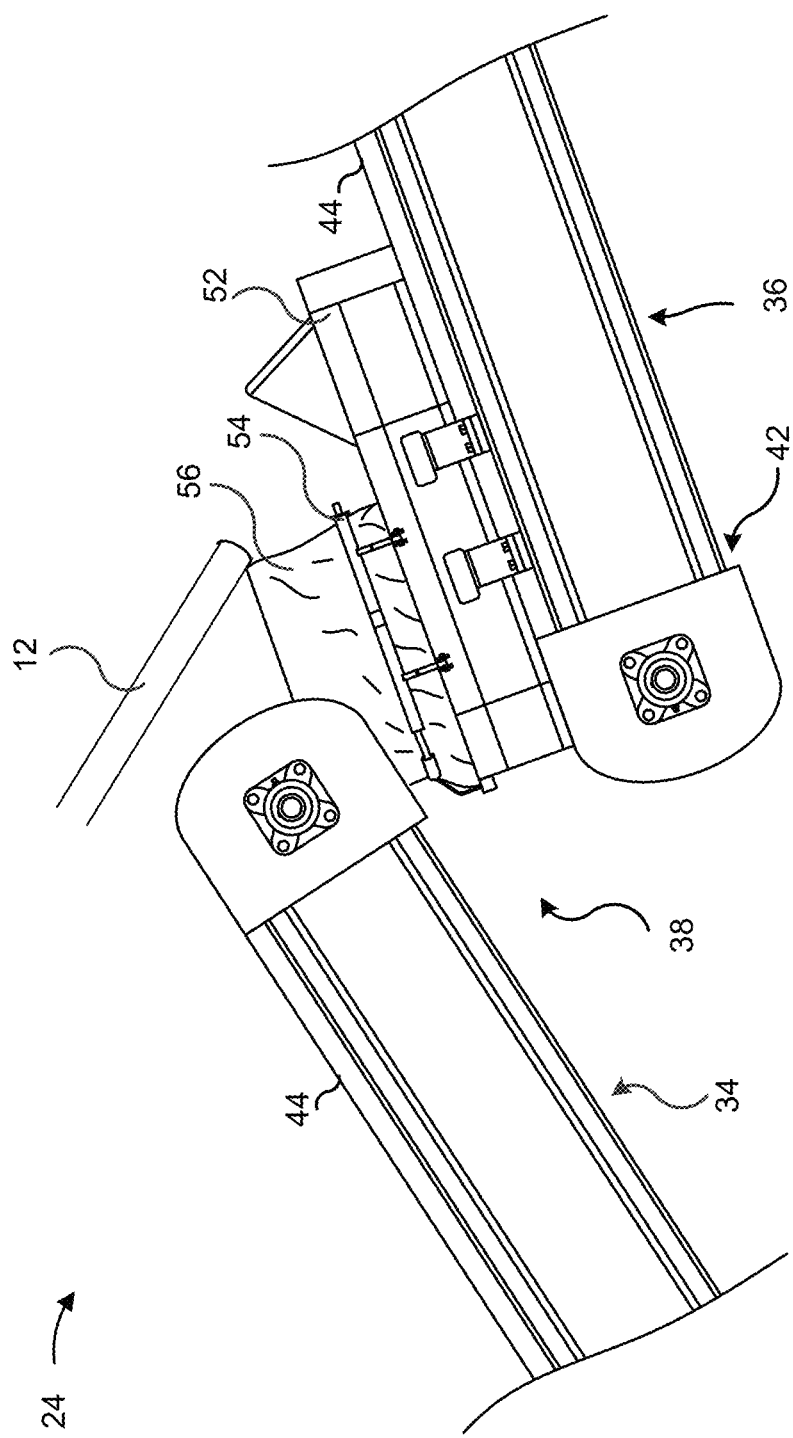
FIG. 2 is a diagram of an example conveyor system that may be used with the cold planer of FIG. 1.

FIG. 2 is a diagram of an example conveyor system 24 that may be used with cold planer 10 of FIG. 1. As shown in FIG. 2, conveyor system 24 includes flexible hopper 38 at a charge end 42 of second conveyor 36. Flexible hopper 38 includes a hopper weldment 52, a flexible frame 54, and a skirt 56 (e.g., a flexible skirt). Flexible hopper 38 is configured to expand and/or contract via the flexible frame 54 based on movement of second conveyor 36 relative to first conveyor 34 (or vice versa) and/or based on movement of second conveyor 36 relative to a direction of travel of a machine implementing conveyor system 24 (e.g., cold planer 10 of FIG. 1).

Hopper weldment 52 includes any type of support structure configured to support flexible frame 54. In some implementations, hopper weldment 52 may include one or more surfaces configured to funnel material transferred from first conveyor 34 to second conveyor 36. For example, hopper weldment 52 may include one or more plates that are to be attached to skirt 56 (e.g., via one or more bolts, via an adhesive, or the like), such that milled material that is transferred through skirt 56, is transferred to second conveyor 36. In some implementations, hopper weldment 52 is U-shaped (e.g., according to a design of flexible frame 54), such that hopper weldment 52 surrounds charge end 42 of second conveyor 36. As such, hopper weldment 52 may be configured to prevent material from falling from charge end 42 of second conveyor 36.

Flexible frame 54 includes any type of flexible structure configured to support and/or attach to skirt 56. Flexible frame 54 may include one or more rigid pieces that are connected to one another via one or more flexible pieces. For example, flexible frame 54 may include one or more brackets that can be flexed or bent via one or more hinges. Additionally, or alternatively, flexible frame 54 may include one or more rigid structures (e.g., tubes or tube-like structures formed from a non-malleable metal or plastic material) with a flexible support (e.g., an elastic tensioning member, such as a bungee cord or the like) strung through the rigid structures, as described herein. Accordingly, flexible frame 54 may be configured to contract or expand based on a configuration of conveyor system 24 (e.g., a position of second conveyor 36 relative to first conveyor 34) and/or based on an amount of material transferring through skirt 56.

In some implementations, flexible frame 54 may include only a flexible support wrapped around and/or connected to skirt 56. For example, flexible frame 54 may include an elastic tensioning member weaved through holes of skirt 56 to cause skirt 56 to contract or expand based on a configuration of conveyor system 24 or based on an amount of milled material transferring through skirt 56.

Skirt 56 may include any flexible material that is capable of being fixed to hopper weldment 52, flexible frame 54, and/or frame 12 (e.g., a frame 12 of cold planer 10). For example, skirt 56 may include one or more sheets of rubber that are fixed together (e.g., sewn together, bolted together, or the like). In some implementations, skirt 56 may be configured as a tube or sleeve, through which milled material is to transfer from first conveyor 34 to second conveyor 36. Skirt 56 may be configured to keep a particular shape or form an enclosure based on a configuration of flexible frame 54 and/or based on how skirt 56 is attached to flexible frame 54. For example, flexible frame 54 may ensure that skirt 56 cannot reach a closed position such that milled material is not capable of transferring through skirt 56.

Skirt 56 may be configured to form an enclosure between a discharge end of first conveyor 34 and charge end 42 of second conveyor 36 of FIG. 2. For example, a first end of skirt 56 may be attached to hopper weldment 52 and a second end of skirt 56 may be configured to open toward first conveyor 34. In some implementations, skirt 56 may be attached to frame 12 and/or first conveyor 34. Skirt 56 may be flexible in that skirt 56 is able to move and flex by virtue of flexible frame 54. Accordingly, skirt 56 can accommodate material flowing from first conveyor 34 to second conveyor 36 and maintain an enclosure between the discharge end of first conveyor 34 and charge end 42 of second conveyor 36. For example, the enclosure may be formed such that any opening(s) in the enclosure formed between first conveyor 34 and second conveyor 36 may be smaller than pieces of the material being transferred from first conveyor 34 to second conveyor 36.

Accordingly, during operation, conveyor system 24, with flexible hopper 38, enables milled material to be transferred from first conveyor 34 to second conveyor 36. Flexible hopper 38 is capable of changing shape according to a configuration of conveyor system 24 and/or the amount of milled material that is being transferred from first conveyor 34 to second conveyor 36 at a particular moment. Such flexibility may prevent material from escaping conveyor system 24.

As indicated above, FIG. 2 is provided as an example. Other examples are possible and may differ from what was described in connection with FIG. 2. In some implementations, conveyor system 24 may include additional components, fewer components, different components, or differently arranged components than those shown in FIG. 2.

Figure 3:
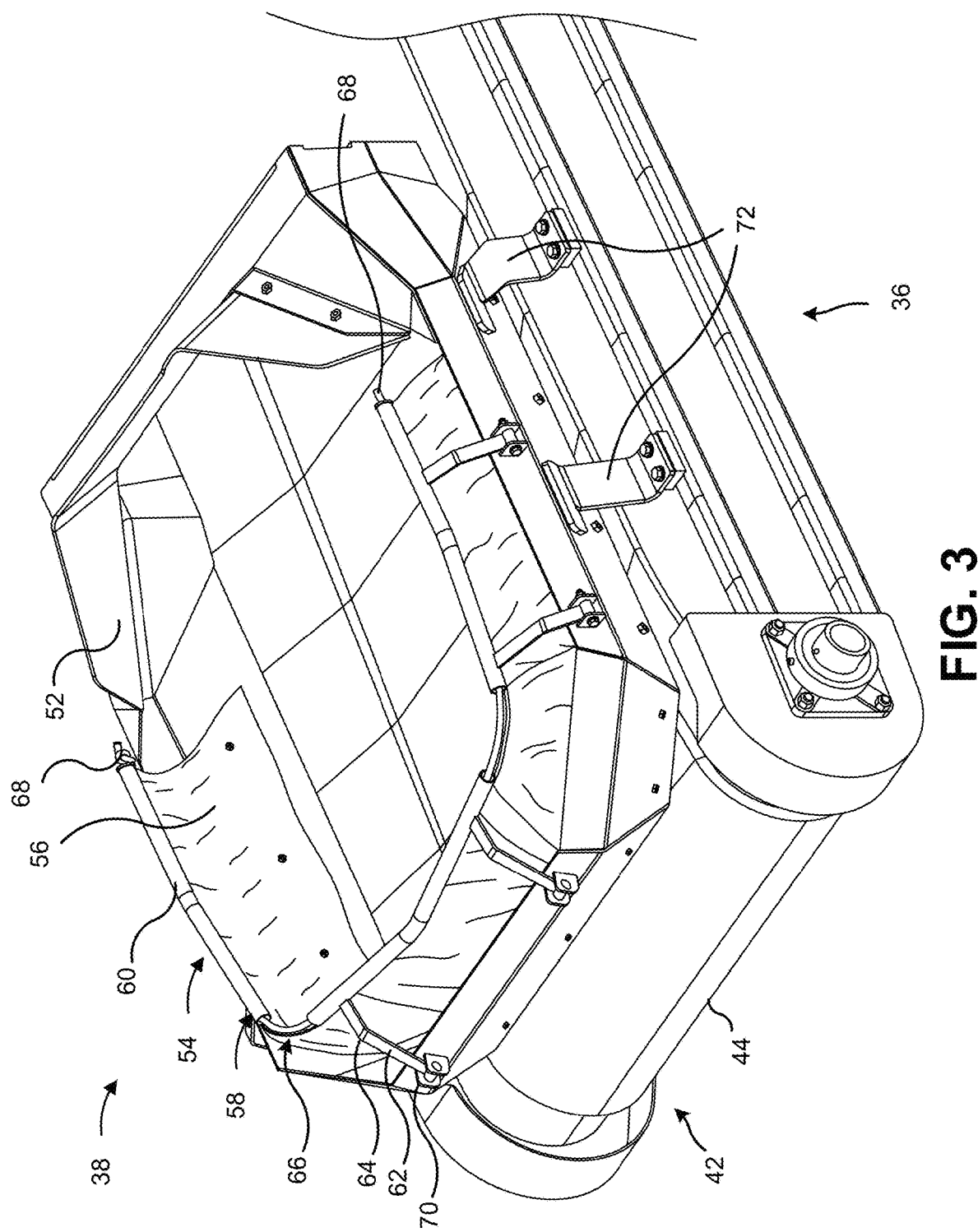
FIG. 3 is an isometric view of an example flexible hopper that may be used in the example conveyor system of FIG. 2.

FIG. 3 is an isometric view of an example flexible hopper 38 that may be used in conveyor system 24 of FIG. 2. As shown in FIG. 3, flexible hopper 38 includes hopper weldment 52, flexible frame 54, and skirt 56 at a charge end 42 of second conveyor 36. Flexible frame 54 is configured to expand or contract via a flexible support 58 with a plurality of frame supports 60 (referred to individually as "frame support 60" or collectively as "frame supports 60") and a plurality of brackets 62 (referred to individually as "bracket 62" or collectively as "brackets 62") with one or more hinges 64 (referred to individually as "hinge 64" or collectively as "hinges 64"). According to some implementations, the flexible support 58 may expand or contract within the frame supports 60 and the hinges 64 of brackets 62 may adjust a configuration of the brackets 62 based on movement of second conveyor 36 and/or based on an amount of material being received by flexible hopper 38. For example, due to skirt 56 being attached to hopper weldment 52 and flexible frame 54, when second conveyor 36 moves, forces applied to skirt 56 from hopper weldment 52 may cause flexible support 58 to expand or contract in one or more locations. As such, due to a rotation of second conveyor 36 about charge end 42, flexible support 58 may expand or contract, causing flexible frame 54 to expand or contract.

As shown in FIG. 3, flexible support 58 includes frame supports 60 and one or more flexible connectors 66 (referred to individually as "flexible connector 66" or collectively as "flexible connectors 66") that are capable of adjusting a size and/or opening of flexible support 58 to enable the shape of flexible frame 54 to be flexible and/or one or more dimensions of flexible frame 54 to be adjustable. Frame supports 60 may be rigid in that frame supports 60 are designed to not be flexible. Frame supports 60 may include one or more rigid metal structures, rigid plastic structures, or the like. In some implementations, flexible support 58 may include a single flexible connector 66 (e.g., a single elastic tensioning member) that stretches through frame supports 60 to each flexible support end 68. In such cases, frame supports 60 may be tubular (e.g., hollow with one or more openings), so that flexible support 58 can pass or be run through each frame support 60. Additionally, or alternatively, flexible support 58 may include a plurality of flexible connectors 66 that connect at least two frame supports 60 together to form flexible support 58. In such a case, frame supports 60 may or may not be tubular.

As shown in FIG. 3, flexible support 58 is U-shaped, such that flexible support ends 68 are separated from one another. In some implementations, flexible support 58, may be continuous, such that there are no flexible support ends 68 and the one or more flexible connectors 66 that form flexible support 58 form an enclosed shape (e.g., a circle, oval, rectangle, or the like).

As further shown in FIG. 3, brackets 62 include hinges 64, such that each bracket 62 is a hinged bracket. Accordingly, flexible support 58 may include a plurality of hinged brackets. Brackets 62 connect to frame supports 60 at a first end of the brackets and hopper weldment 52 via bracket connectors 70 at a second end of the brackets. Bracket connectors 70 may enable brackets 62 to pivot relative to hopper weldment 52. Although FIG. 3 shows each bracket 62 with one hinge 64, in some implementations, brackets 62 may include more than one hinge 64 or brackets 62 may not include hinges 64. Hinges 64 enable a configuration of brackets 62 to be adjusted, such that an angle between legs of brackets 62 can be increased or decreased based on flexible support 58 (and/or flexible connector 66) moving, expanding, and/or contracting.

In the example of FIG. 3, hopper weldment 52 is attached to second conveyor 36 via hopper brackets 72. Hopper brackets 72 may be attached to second conveyor 36 and configured such that hopper weldment 52, and correspondingly flexible hopper 38, are at charge end 42 of second conveyor 36.

As indicated above, FIG. 3 is provided as an example. Other examples are possible and may differ from what was described in connection with FIG. 3. In some implementations, conveyor system 24 may include additional components, fewer components, different components, or differently arranged components than those shown in FIG. 3. For example, in some implementations, flexible support 58 may not include frame supports 60 or brackets 62. In such a case, flexible support 58 may include one or more elastic tensioning members that are wrapped around and/or woven through openings in skirt 56 (e.g., a configuration of openings or holes in skirt 56 configured to receive flexible support 58). Furthermore, the size (e.g., the width) of flexible hopper 38 relative to the size (e.g., the width) of second conveyor 36 is provided as an example. In practice, the size (e.g., the width) of flexible hopper 38 may be bigger than, the same as, or smaller than the size (e.g., the width) of second conveyor 36.

Figure 4:
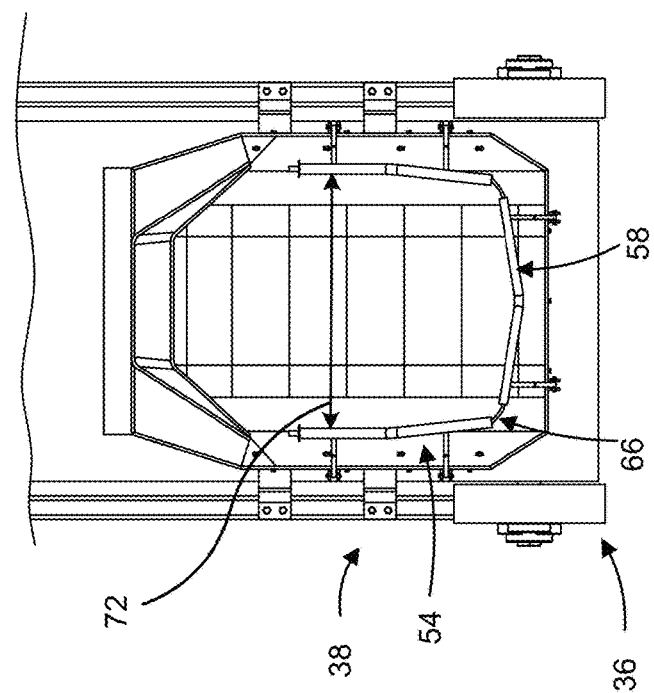
FIG. 4 is an isometric view and a top view of an example implementation of a flexible frame of the example flexible hopper of FIG. 3 in a contracted position.
Figure 4:
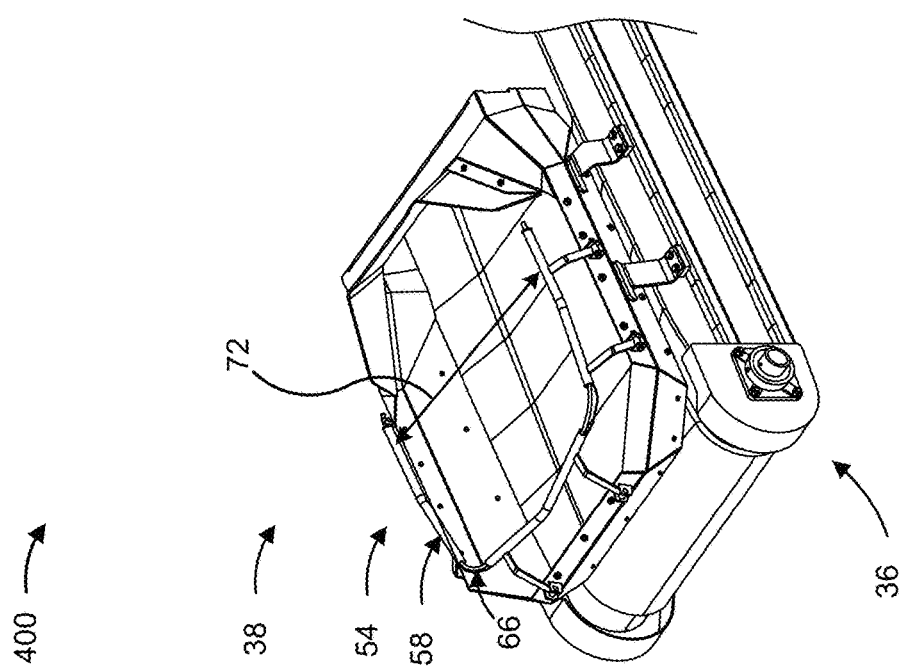

FIG. 4 is an isometric view and a top view of an example implementation 400 of a flexible frame 54 of the example flexible hopper 38 of FIG. 3 in a contracted position. As shown in FIG. 4, flexible frame 54 is in a contracted position as a frame opening 72 has a minimum width (e.g., a minimum width according to a design of flexible frame 54). Example implementation 400 may show flexible hopper 38 at rest (e.g., while flexible hopper 38 is not receiving material). Accordingly, flexible support 58 and/or flexible connector 66 may be in a contracted position according to properties of flexible connector 66.

In some implementations, flexible frame 54, when in the contracted position, may have a relatively uniform (or symmetrical) shape. In some implementations, flexible frame 54 is in the contracted position when material is not being received by flexible hopper 38 (e.g., material is not being transferred through skirt 56). Additionally, or alternatively, flexible frame 54 may be in the contracted position when second conveyor 36 is aligned with first conveyor 34, such that the material conveys in a same direction on the other conveyor as the material conveys on second conveyor 36 (e.g., relative to a configuration of conveyor system 24).

As indicated above, FIG. 4 is provided as an example. Other examples are possible and may differ from what was described in connection with FIG. 4.

Figure 5:
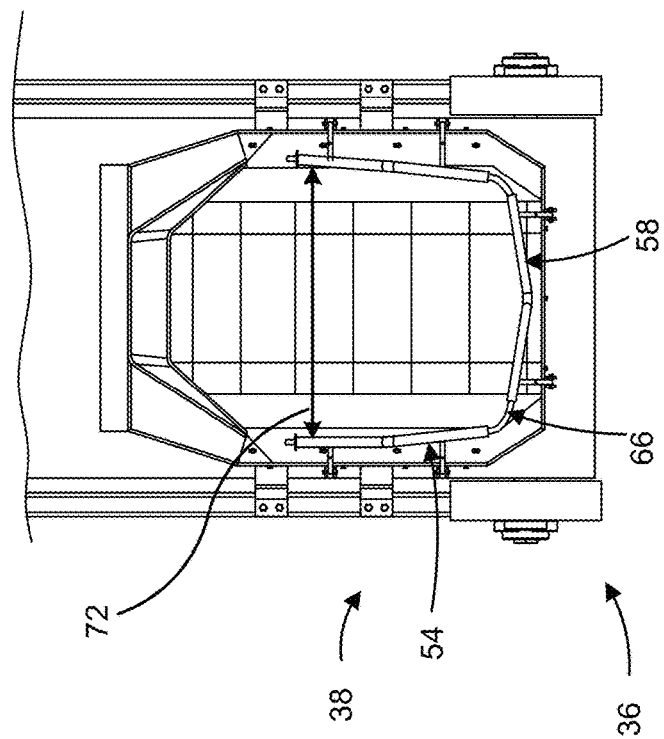
FIG. 5 is an isometric view and a top view of an example implementation of a flexible frame of the example flexible hopper of FIG. 3 in an expanded position.
Figure 5:
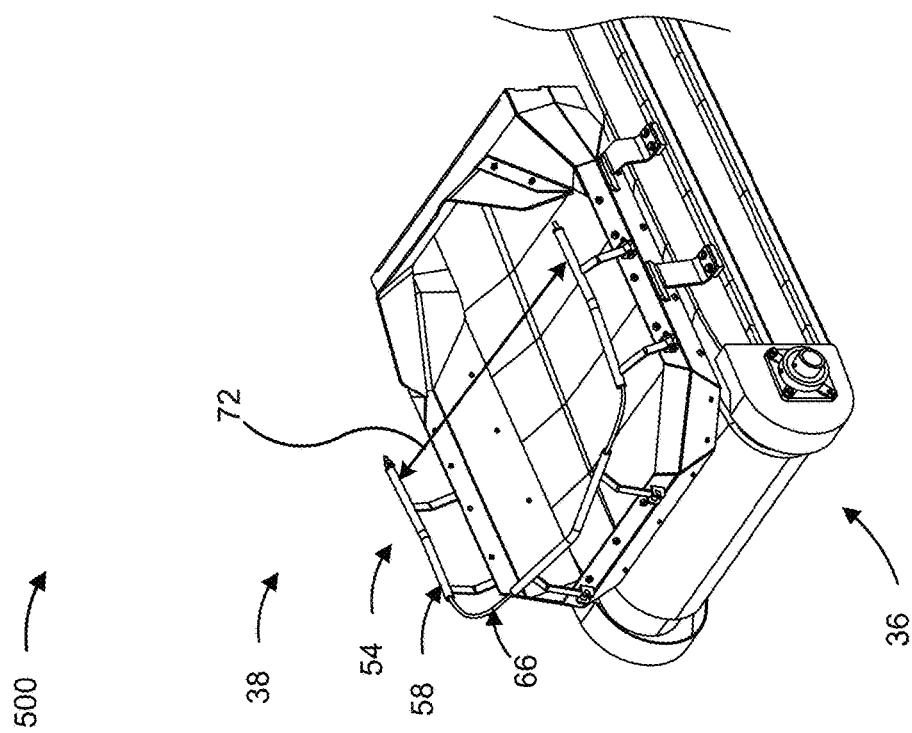

FIG. 5 is an isometric view and a top view of an example implementation 500 of a flexible frame 54 of the example flexible hopper 38 of FIG. 3 in an expanded position. As shown in FIG. 5, flexible frame 54 is in expanded position as a frame opening 72 has a wider width that the width of example implementation 400 of FIG. 4. Example implementation 500 may show flexible hopper 38 during operation.

In the example of FIG. 5, flexible frame 54 may be in an expanded position due to flexible support 58 (and corresponding flexible connector 66) being in non-contracted positions. For example, due to pressure or forces applied on flexible frame 54 by milled material being received by flexible hopper 38 and/or by a frame (e.g., frame 12) supporting second conveyor 36, flexible frame 54 may shift or adjust (e.g., from the contracted position of example implementation 400) according to the properties of flexible support 58 and/or flexible connector 66. Accordingly, flexible frame 54 may have a first shape when flexible hopper 38 (or conveyor system 24 cold planer 10) is not in operation or not receiving material (e.g., as shown in example implementation 400 of FIG. 4) and a second shape, that is different from the first shape, when flexible hopper 38 (or conveyor system 24 or cold planer 10) is in operation or receiving material (e.g., as shown in example implementation 500).

In example implementation 500, flexible frame 54, when in the expanded position, may have a non-uniform shape or non-symmetrical shape that is based on a position of second conveyor 36 relative to first conveyor 34 and/or an amount of material that is being received by flexible hopper 38. In some implementations, flexible frame 54 is in the expanded position when material is being received by flexible hopper 38 (e.g., material is being transferred through skirt 56). Additionally, or alternatively, flexible frame 54 may be in the expanded position when second conveyor 36 is not aligned with another conveyor (e.g., first conveyor 34), such that second conveyor 36 conveys material in a different direction than the other conveyor (e.g., relative to a configuration of conveyor system 24).

As indicated above, FIG. 5 is provided as an example. Other examples are possible and may differ from what was described in connection with FIG. 5.

INDUSTRIAL APPLICABILITY

The flexible hopper 38 may be used with conveyor system 24 where proper transfer of material (e.g., milled material) is desired, such as during operation of a cold planer 10, a mining system, a standalone conveyor system, or the like. The disclosed flexible hopper 38 may enable conveyor system 24 to adjust a configuration and/or receive various amounts of material without allowing the material to escape first conveyor 34 and second conveyor 36 of conveyor system 24. Accordingly, flexible hopper 38 enables flexible functionality to adjust the configuration of conveyor system 24 (e.g., to adjust a position of second conveyor 36 relative to first conveyor 34), while maintaining operability of conveyor system 24 (e.g., because material does not escape the conveyor system and cause a failure). For example, including flexible hopper 38 on charge end 42 of second conveyor 36 enables second conveyor 36 to pivot (e.g., about charge end 42 and/or a discharge end of first conveyor 34) relative to first conveyor 34. Having such a capability without sacrificing the desired functionality of conveyor system 24 enables cold planer 10 to discharge material (e.g., from discharge end 40 of second conveyor 36) in a variety of directions relative to a direction of travel. As such, a haul truck to receive the discharged material may not necessarily need to be placed in front of cold planer 10 while under operation. For example, the haul truck can be placed to a side of cold planer 10 to receive a first load of material while another haul truck is aligned in front of cold planer 10 to receive a second load of the material. Such an operation may enable cold planer 10 to operate nearly continuously without needing to wait for another haul truck to be aligned with discharge end 40 of the second conveyor 36. Therefore, costs (e.g., fuel costs, wear and tear, or the like) associated with stopping and starting the operation of cold planer 10 are avoided, while enabling proper transfer of milled material through conveyor system 24.

Furthermore, flexible hopper 38 can prevent damage to one or more machines utilizing conveyor system 24 (e.g., cold planer 10). Flexible frame 54 and skirt 56 enable flexible hopper 38 to receive material from first conveyor 34 without letting the material escape second conveyor 36 or conveyor system 24. Such damage may occur due to the material improperly or unexpectedly escaping conveyor system 24. Such damage may occur due to the transferred material impacting parts of the one or more machines, causing mechanical failures (e.g., due to causing friction between moving parts of the one or more machines), electrical failures (e.g., due to shorting circuits or destroying electronic components), or the like. Accordingly, including flexible hopper 38 with a conveyor system 24 may lower costs of replacing equipment, maintenance, and/or repairs relative to previous conveyor systems by preventing material from escaping conveyor system 24.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A cold planer, comprising:
    a frame;
    at least one traction device configured to support the frame;
    a milling drum;
    an engine supported by the frame and configured to drive the at least one traction device to propel the cold planer and the milling drum to remove material;
    a first conveyor comprising a first charge end, configured to receive material removed by the milling drum, and a first discharge end;
    a second conveyor comprising a second charge end and a second discharge end; and
    a flexible hopper fixed to the second charge end of the second conveyor and configured to receive material from the first discharge end of the first conveyor, wherein the flexible hopper comprises:
        a flexible frame, and
        a flexible skirt attached to the frame and configured to form an enclosure between the first discharge end and the second charge end.

2. The cold planer of claim 1, wherein the flexible hopper further comprises a hopper weldment,
    wherein the hopper weldment is attached to the second conveyor and supports the flexible frame.

3. The cold planer of claim 2, wherein a first end of the flexible skirt is attached to the hopper weldment and a second end of the flexible skirt is attached to the frame to form the enclosure.

4. The cold planer of claim 3, wherein the flexible frame is attached to the flexible skirt between the first end of the flexible skirt and the second end of the flexible skirt.

5. The cold planer of claim 1, wherein the flexible frame comprises:
    a flexible support formed from a flexible connector and a plurality of frame supports,
        wherein the flexible support is attached to the flexible skirt to form the enclosure; and
    a plurality of brackets connected to a hopper weldment and the flexible support,
        wherein the hopper weldment is connected to the second conveyor.

6. The cold planer of claim 5, wherein the flexible connector comprises an elastic tensioning member that runs through one or more of the plurality of frame supports to form the flexible support.

7. The cold planer of claim 5, wherein each one of the plurality of brackets comprises a hinge.

8. The cold planer of claim 1, wherein the flexible frame has a first shape when the cold planer is in operation and the flexible frame has second shape when the cold planer is not in operation.

9. A machine comprising:
    a milling drum configured to remove material;
    a conveyor to convey material from a charge end to a discharge end,
        wherein the material is received at the charge end from the milling drum; and
    a flexible hopper configured to receive material from the discharge end,
        wherein the flexible hopper comprises:
            a flexible frame, and
            a flexible skirt attached to the flexible frame and configured to form an enclosure associated with the discharge end.

10. The machine of claim 9, wherein the conveyor is a first conveyor, the charge end is a first charge end, and the discharge end is a first discharge end, and
    wherein the machine further comprises:
        a second conveyor to convey material from a second charge end to a second discharge end,
            wherein the flexible hopper includes a hopper weldment surrounds the second charge end to enable the enclosure to be formed between the first discharge end and the second charge end.

11. The machine of claim 10, wherein the flexible frame comprises one or more flexible supports to enable an opening of the flexible hopper to expand or contract based on a rotation of the second conveyor about the second charge end.

12. The machine of claim 9, wherein the machine further comprises:
    a frame that supports the milling drum, the conveyor, and the flexible hopper, and
    wherein the flexible hopper includes a hopper weldment, wherein a first end of the flexible skirt is attached to a hopper weldment and a second end of the flexible skirt is attached to the frame to form the enclosure.

13. The machine of claim 12, wherein the enclosure extends from the discharge end to the hopper weldment and the flexible frame is attached to the flexible skirt between the first end and the second end.

14. The machine of claim 9, wherein the flexible frame comprises one or more flexible supports to enable the flexible frame to expand or contract based on an amount of the material received by the flexible hopper.

* * * * *